UNITED STATES PATENT OFFICE.

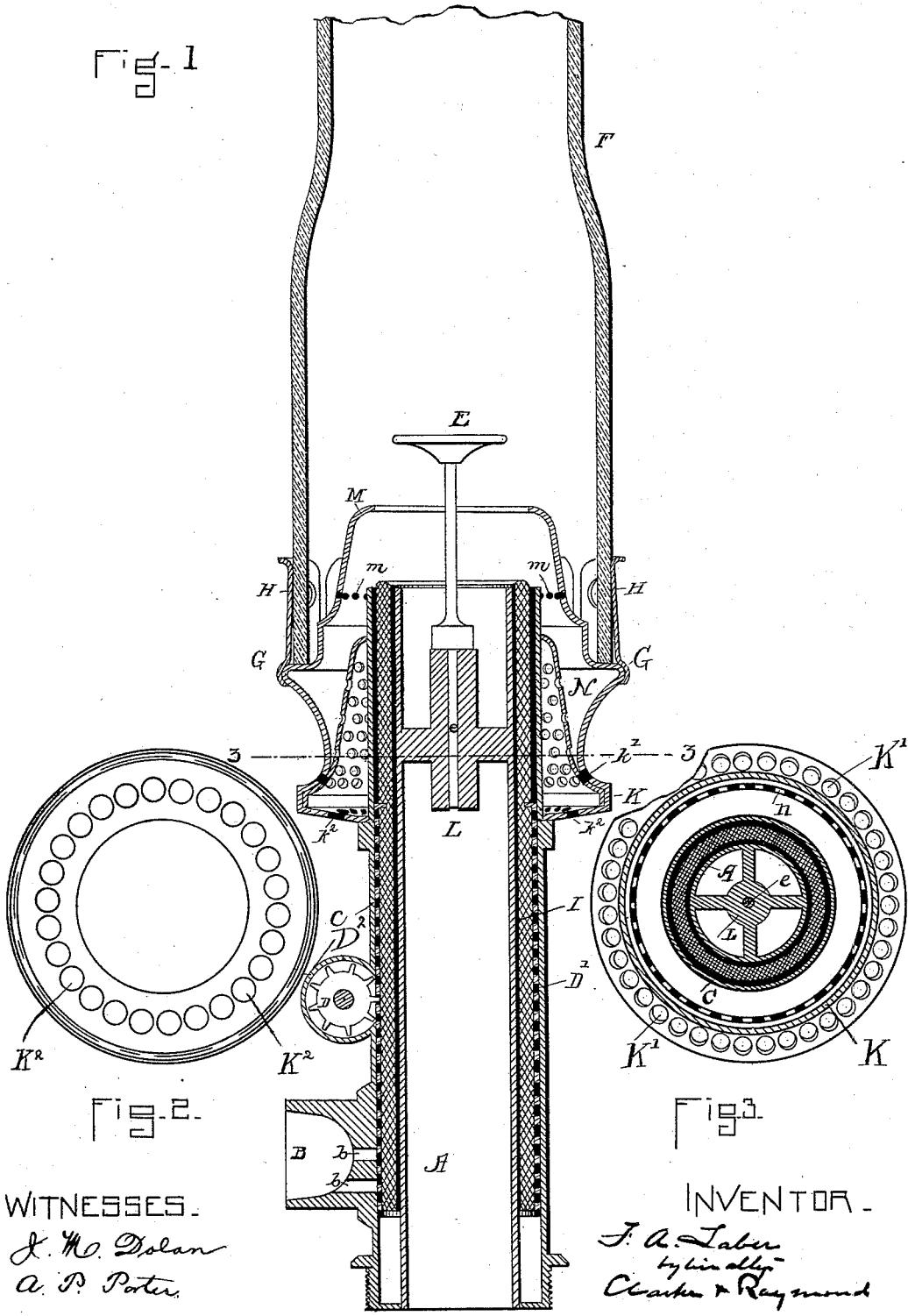

FREEMAN A. TABER, OF BOSTON, MASSACHUSETTS, ASSIGNOR TO THE STAR BRASS MANUFACTURING COMPANY, OF SAME PLACE.

LAMP-BURNER.

SPECIFICATION forming part of Letters Patent No. 415,952, dated November 26, 1889.

Application filed September 3, 1888. Serial No. 284,491. (No model.)

*To all whom it may concern:*

Be it known that I, FREEMAN A. TABER, of Boston, in the county of Suffolk and State of Massachusetts, a citizen of the United States, have invented a new and useful Improvement in Argand Lamp-Burners, whereof the following is a specification, sufficient to enable others skilled in the art to make and use this invention.

In the drawings, Figure 1 is a section of a burner made according to my invention. Fig. 2 is a plan of the lower side of the deflector-casing. Fig. 3 is a section upon the dotted line 3 3 of Fig. 1.

It is exceedingly desirable that oils having a high fire-test should be used in the lighting of cars, and, indeed, in many cases statutes have been passed regarding this. Difficulties, however, occur in the use of the highest fire-test mineral oils—viz., those which are known in trade as the "mineral sperm-oils." These difficulties have been in some degree overcome by burners formerly invented; but the present burner is believed to be better than any hitherto made for this purpose. I propose to employ a burner of the Argand type—that is, a burner having a hollow cylindrical wick with a supply of air in the interior.

A represents the interior cylinder of this burner.

B is a boss formed upon the side of the exterior casing C of the wick-tube, through which boss are perforated the oil-channels $b$. A space within which the wick may be moved freely separates the outer casing C of the wick-tube from the inner casing A of the wick-tube. The wick is placed upon the inside of a sheet-metal shield D', which is perforated by very numerous small holes arranged in vertical lines. To the exterior casing C of the wick-tube is attached a boss $D^2$, within which is a toothed wheel D, the teeth of which are adapted to engage with the perforations in the perforated sheet-metal shield D' and lift it up and down. The stem-holder L is supported within the wick-tube by arms which are connected with the inner lining A of said wick-tube, and this stem-holder L is perforated from end to end, as shown, for the reception of the stem $e$ of the button E. A deflector M is placed above and exterior to the flame, which deflector is perforated with a number of small holes $m$, allowing communication from the interior of the deflector to its exterior above the base of the chimney F. The chimney F is of the ordinary locomotive type and rests on the chimney-gallery G, formed on the casing K, and is held in place by springs or standards H. Although these parts have not hitherto all been assembled together, yet no claim is made for them individually or in combination with each other, except they be in further combination with things hereinafter to be described.

Below the chimney-gallery G extends the casing K, which for a considerable distance below the end of the wick-tube is continuous and imperforate, and inside of this casing is placed the perforated screen N. (Shown in Fig. 1.) The casing K is perforated near and below the base of the screen N, at K' and $K^2$, in the form of the device which I prefer, and which is illustrated at Fig. 1. In this form of device air enters to the flame through the interior of the wick, and is somewhat heated in its passage upward and supplies the interior of the wick, with the air necessary for combustion. The air for the exterior of the wick enters through the passages K' and $K^2$, (shown in Fig. 1,) and is admitted by them inside of the casing K and screen N. This casing K and screen N are in contact with the exterior of the wick-tube only at the upper end of the screen and the lower edge of the casing, and only by the edges of the thin sheet metal of which the casing and screen are composed. In consequence of this the heat from the flame is not communicated to the casing and screen so completely as it might otherwise be, but is retained in the wick-tube and serves to liquefy the oil. Air rising through the screen N is moderately heated and serves to supply the oxygen necessary to combustion. Some of it escapes through the small holes $m$ in the deflector M into the cavity of the chimney and makes that of a uniform temperature. The deflector M causes the air rising from the outside of the flame to impinge upon it closely, and the button E above the center of the flame causes it to spread, and thus makes the flame very thin and produces thereby very perfect combustion.

I know of the patents granted to A. C. Vaughan, No. 106,971, August 30, 1870, for locomotive head-light; to J. B. Fuller, No. 103,598, May 31, 1870, for lamp-burner, and to E. Beach, No. 381,099, April 17, 1888, for Argand lamp-burner; and I do not claim any of the devices or combinations shown in any of said Letters Patent.

I claim as my invention and desire to secure by Letters Patent—

1. The combination, with an Argand burner, of the perforated screen N, impinging at its top only against the outer side of the wick-tube of said burner and extended downward and flared outward from said wick-tube at its bottom, and the casing K, surrounding said screen and formed entire or imperforate except near or below the base of said screen, whereby the space between the casing K and the wick-tube is divided into two air-chambers separated from each other by an inclined perforated screen, substantially as set forth.

2. The combination, with an Argand burner, of the perforated screen N, impinging at its top only against the outer side of the wick-tube of said burner and extended downward and flared outward from said wick-tube at its bottom, the casing K, surrounding said screen and formed entire or imperforate except near or below the base of said screen, whereby the space between the casing K and the wick-tube is divided into two air-chambers separated from each other by an inclined perforated screen, and the chimney gallery or support G and perforated deflector M above said casing K, substantially as set forth.

3. The combination, with an Argand burner, of the perforated screen N, impinging at its top only against the outer side of the wick-tube of said burner and extended downward and flared outward from said wick-tube at its bottom, the casing K, surrounding said screen and formed entire or imperforate except near or below the base of said screen, whereby the space between the casing K and the wick-tube is divided into two air-chambers separated from each other by an inclined perforated screen, the button E, its stem $e$, and the stem-holder L, substantially as set forth.

4. The combination, with an Argand burner, of the perforated screen N, impinging at its top only against the outer side of the wick-tube of said burner and extended downward and flared outward from said wick-tube at its bottom, the casing K, surrounding said screen and formed entire or imperforate except near or below the base of said screen, whereby the space between the casing K and the wick-tube is divided into two air-chambers separated from each other by an inclined perforated screen, and the chimney gallery or support G and perforated deflector M above said casing K, the button E, its stem $e$, and the stem-holder L, substantially as set forth.

FREEMAN A. TABER.

In presence of—
F. F. RAYMOND, 2d,
J. M. DOLAN.